(No Model.) 10 Sheets—Sheet 1.

F. A. MESSER & W. F. THORPE.
MEANS FOR CHECKING AND RECORDING MONEY PAYMENTS.

No. 463,526. Patented Nov. 17, 1891.

Fig. 1

(No Model.) 10 Sheets—Sheet 2.

F. A. MESSER & W. F. THORPE.
MEANS FOR CHECKING AND RECORDING MONEY PAYMENTS.

No. 463,526. Patented Nov. 17, 1891.

(No Model.) 10 Sheets—Sheet 3.

F. A. MESSER & W. F. THORPE.
MEANS FOR CHECKING AND RECORDING MONEY PAYMENTS.

No. 463,526. Patented Nov. 17, 1891.

Witnesses:
J. A. Rutherford
Geo. W. Rea

Inventors:
Frederick A. Messer
and Walter F. Thorpe
By James L. Norris
Attorney.

(No Model.) 10 Sheets—Sheet 4.

F. A. MESSER & W. F. THORPE.
MEANS FOR CHECKING AND RECORDING MONEY PAYMENTS.

No. 463,526. Patented Nov. 17, 1891.

Witnesses. Inventors.
Frederick A. Messer.
Walter F. Thorpe.
By James L. Norris
Atty.

(No Model.) 10 Sheets—Sheet 6.

F. A. MESSER & W. F. THORPE.
MEANS FOR CHECKING AND RECORDING MONEY PAYMENTS.

No. 463,526. Patented Nov. 17, 1891.

Witnesses.
J. A. Rutherford
Geo. N. Rea

Inventors
Frederick A. Messer.
Walter F. Thorpe.
By James L. Norris.
Atty.

(No Model.) 10 Sheets—Sheet 9.

F. A. MESSER & W. F. THORPE.
MEANS FOR CHECKING AND RECORDING MONEY PAYMENTS.

No. 463,526. Patented Nov. 17, 1891.

United States Patent Office.

FREDERICK ALFRED MESSER AND WALTER FULLER THORPE, OF LONDON, ENGLAND.

MEANS FOR CHECKING AND RECORDING MONEY PAYMENTS.

SPECIFICATION forming part of Letters Patent No. 463,526, dated November 17, 1891.

Application filed October 12, 1889. Serial No. 326,815. (No model.) Patented in England April 11, 1888, No. 9,398.

*To all whom it may concern:*

Be it known that we, FREDERICK ALFRED MESSER and WALTER FULLER THORPE, engineers, subjects of the Queen of Great Britain, both residing at 8 Quality Court, Chancery Lane, London, in the county of Middlesex, England, have invented certain new and useful Improvements in Means and Appliances for Checking and Recording the Payment and Receipt of Money and Analogous Operations, (for which we have obtained a patent in Great Britain, No. 9,398, bearing date April 11, 1888,) of which the following is a specification.

Our invention relates to improved mechanism and arrangements for the same for indicating, checking, and registering the payment and receipt of money and analogous operations.

The indicating portion of our invention is so arranged and the mechanism for actuating the figures belonging to the various denominations is so constructed that any figure or set of figures forming a sum in the sequence of any one denomination can be so adjusted and placed with regard to the figures of another or other denominations that every combination necessary to form a perfect money sequence within the extreme of the highest and lowest values determined upon can be displayed. By this arrangement the figures representing the amount of any transaction always appear in their natural consecutive order and symmetrical position, as, for example, the following figures: $\begin{smallmatrix} \$ & c \\ 90 & 5 \end{smallmatrix}$ Our invention consists of a cash indicating and registering machine inclosed in a suitable case fitted with actuating-handles and disks or their equivalents. We record the amount on dials or by printing, the mechanism of the same being inclosed by a suitable case, such mechanism being also suitably governed and controlled by the operation of the handles.

In carrying out our invention we arrange the figures on the faces of disks, the necessary motion being given to the same by means of rotating handles or equivalent appliances. Further, in combination with the before-mentioned part of the apparatus, we arrange dials and pointers for respectively registering and totaling under their respective denominations the various amounts of each transaction, or we record, by printing, the amount of each transaction on a ribbon of paper or other suitable material, hereinafter called "ribbon." We sometimes register by both the before-mentioned methods. We mark the indicating-disks (for United States currency, which requires four disks) in the following manner: 1, 2, 3, 4, 5, 6, 7, 8, and 9 for tens of dollars, 1 2 3 4 5 6 7 8 9 0 for units of dollars, and the disks for tens and units of cents in the same manner. The indicating-disks are actuated by means of rotating handles, one handle for each disk, with pointers attached thereto, and in the annular path of each of these actuating-handles we mark or indicate the figures (naughts or zero-marks) of the denomination belonging to the disk with which it is connected. When the operator rotates one of these actuating-handles until its pointer points to a figure in that series, the disk in connection with the same is by means of suitable mechanism, hereinafter described, moved in unison therewith and displays a corresponding figure at its indicating-opening, which opening is preferably in the front and upper part of the case of the machine, or in such position as to be best observed by the customer.

In order that our said invention may be particularly described and ascertained, reference is hereby made to the accompanying drawings, in which similar letters of reference indicate corresponding parts.

Figure 1:
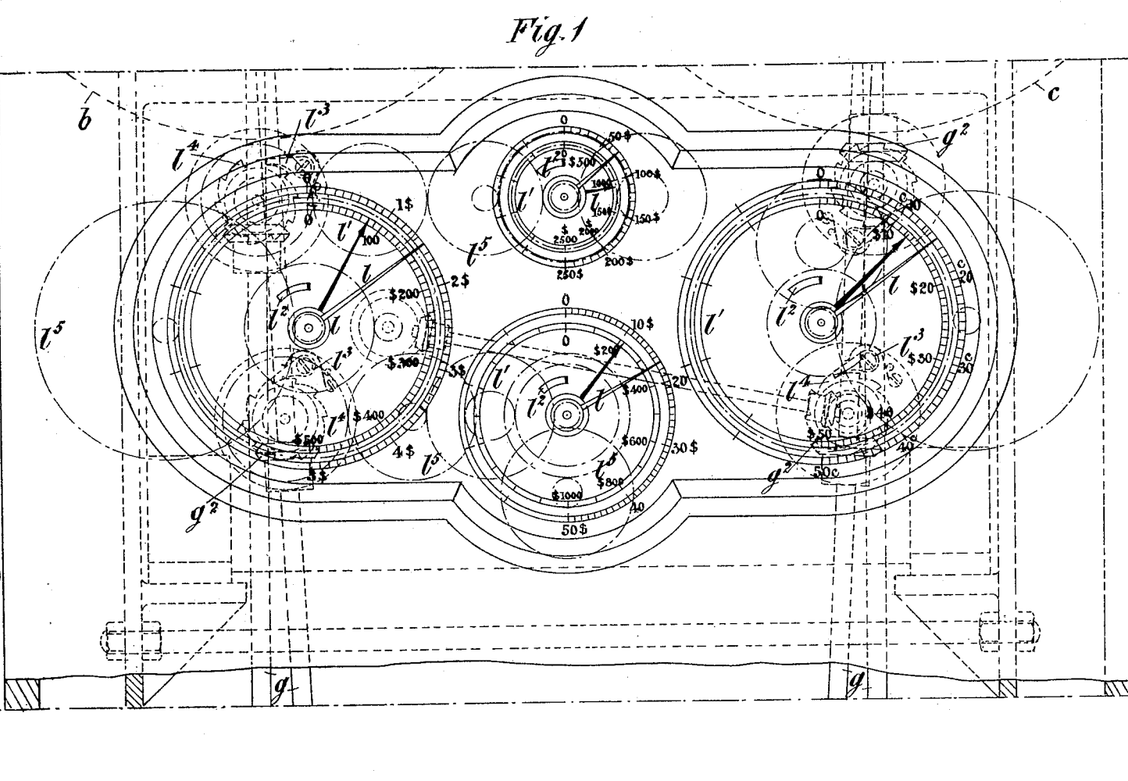
Figures 1, 1$^a$, and 1$^b$ are partial views, which, taken together, indicate a front elevation of our cash indicating and registering apparatus, partly in section.
Figure 1A:
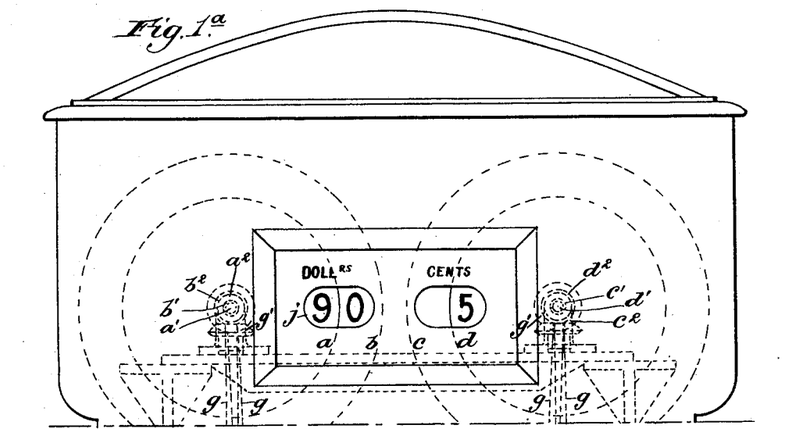
Figure 1B:
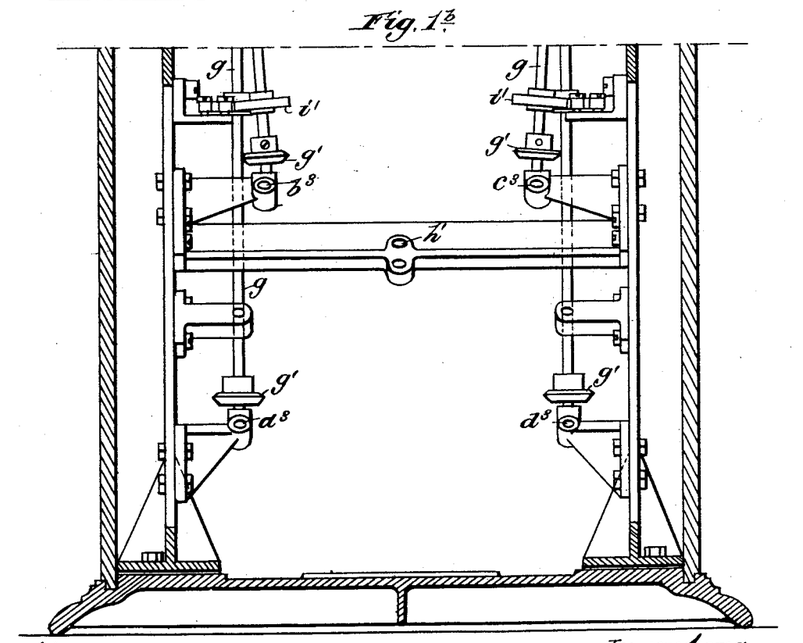

Referring to Figs. 1 to $2^c$, the disks $a\ b\ c\ d$ are mounted on spindles $a'\ b'\ c'\ d'$ in supports or bearings $a^2\ b^2\ c^2\ d^2$ in the upper part of the machine. The figures are printed or otherwise marked on the surfaces of the disks $a\ b\ c\ d$ near their outer edges.

For United States currency we prefer to arrange the disks for tens and units of dollars concentrically, or on the same center line, and the tens and units of cents also concentrically, or on the same center line. By this arrangement we are enabled to bring the display of figures of the various denominations into proportional proximity with each other.

Figure 2:
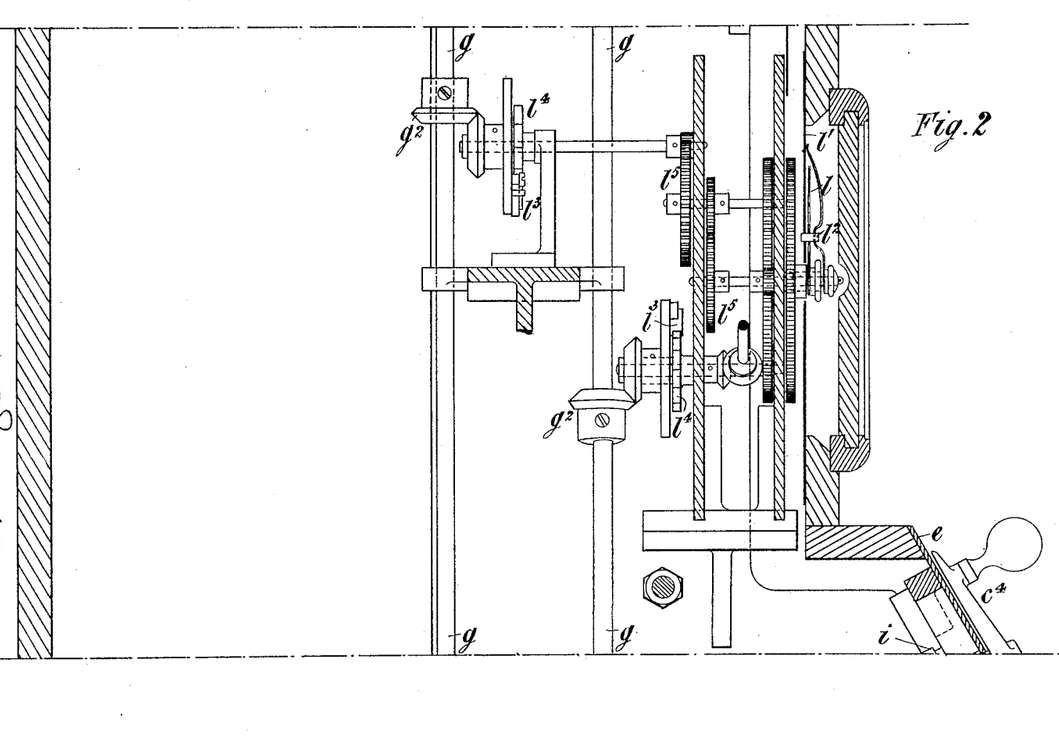
Figs. 2, 2$^a$, 2$^b$, and 2$^c$ are partial views, which, taken together, indicate a side elevation, partly in section.
Figure 2A:
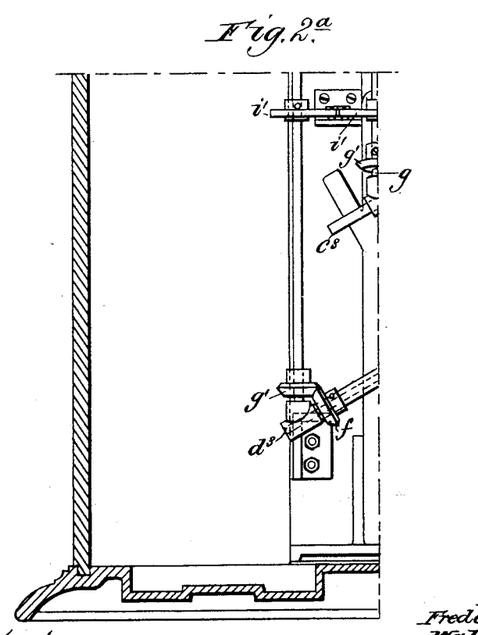
Figure 2C:
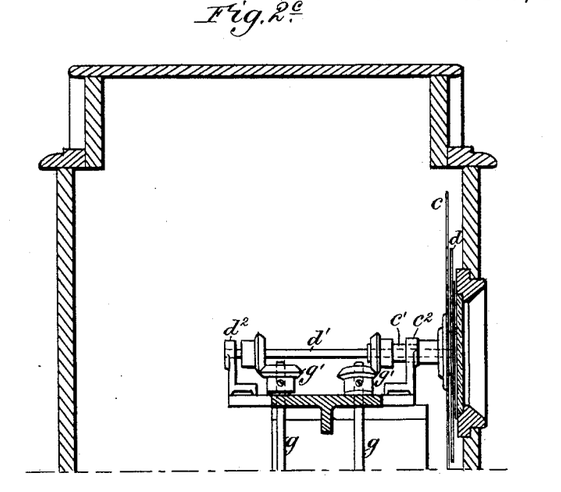

In the front and lower part of the machine is fitted a plate $e$, Figs. 2, $2^b$, and 3, preferably in an inclined position, through which the spindles $a^3, b^3, c^3$, and $d^3$ of the actuating-handles $a^4, b^4, c^4$, and $d^4$ pass. On the outside surface of this plate $e$ is engraved or marked round the respective paths of the pointers of the actuating-handles of the various denominations the figures of each denomination, as before described. The spindle of each actuating-handle carries a bevel-wheel $f$, and also has mounted thereon a ratchet-wheel $f'$ and the half of a clutch $f^2$. This combination of bevel-wheel, ratchet-wheel, and half-clutch is fixed to a sleeve or spindle $f^{14}$, which is loose on its spindle and capable of rotating on the same when permitted to do so. A pawl $f^3$, hereinafter particularly described, retains this ratchet-wheel combination in any position to which it may be moved, and thus the indicating-disk is held or retained in the position last indicated until the next operation. The other or sliding half $f^4$ of the clutch is feathered on the handle-spindle before mentioned, and is kept in gear with the half-clutch $f^2$ by means of a suitably-arranged spiral spring $f^5$. Sometimes we modify this clutch to the form shown in Fig. 17. Vertical and other shafts $g$, with suitable bevel-wheels $g'$, Figs. $1^a$ and $2^c$, convey the motion of the handle-spindles $a^3, b^3, c^3$, and $d^3$ to the spindles $a', b', c'$, and $d'$ of the indicating-disks $a, b, c$, and $d$, so that the operator on setting any one or more of the actuating-handles at the figures of one or more denominations conveys, through the above-described mechanism, such motion to the disk or disks whereby they show a figure or figures in unison with those to which the pointer or pointers of the actuating handle or handles is or are directed.

Figure 4:
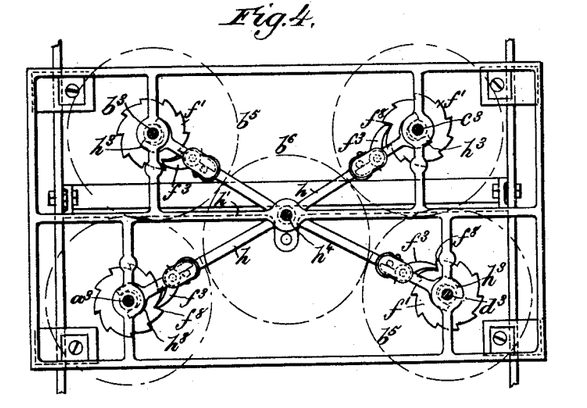
Fig. 4 is a face view of the releasing apparatus with the ratchet-wheels shown in their zero position, and also showing by dotted lines the wheels for driving the printing apparatus.
Figure 6:
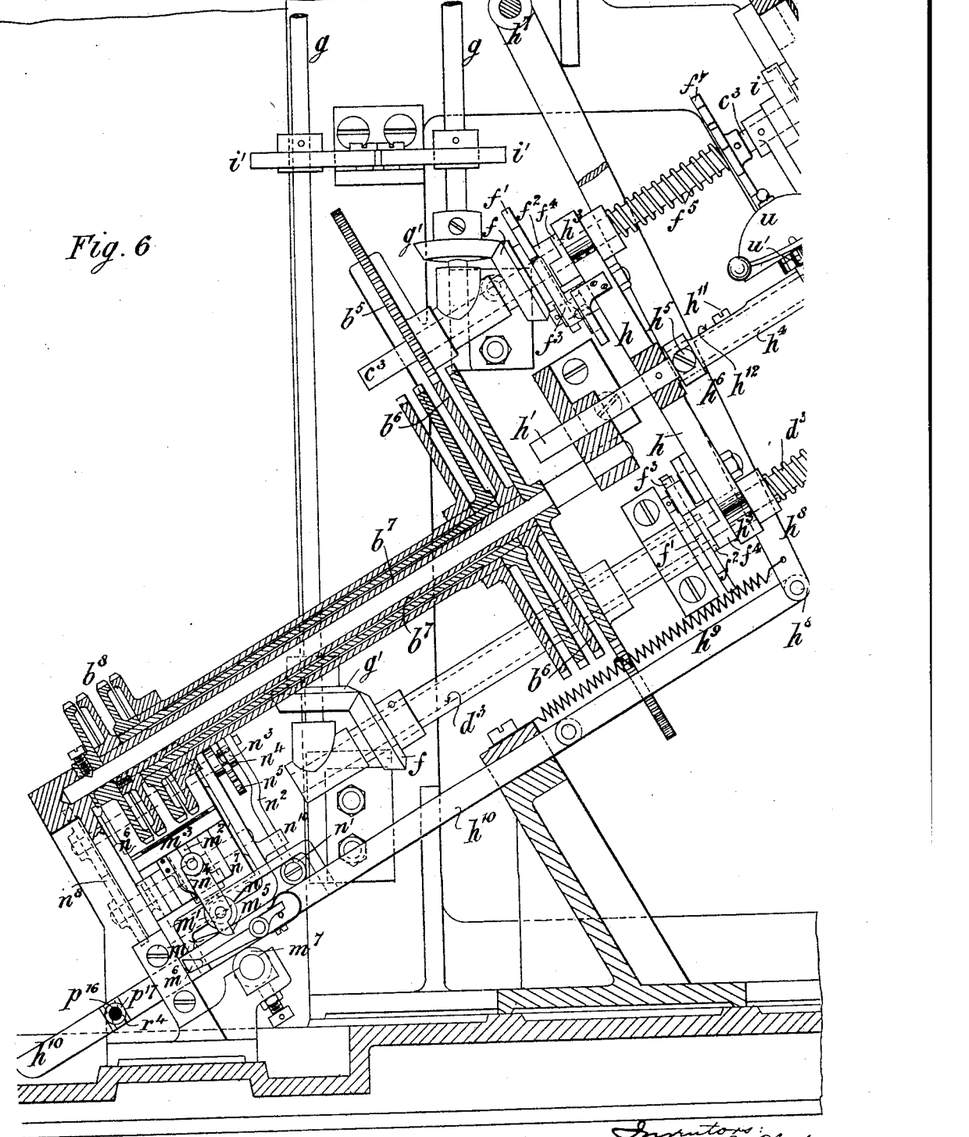
Fig. 6 is a side elevation, partly in section, of the above-mentioned printing apparatus shown in its relation to the other mechanism of the machine.

Referring to Figs. $2^b$ and 4, the releasing apparatus (for the purpose of allowing the disks $a, b, c,$ and $d$ at the proper period to return to zero) consists of a cross-frame $h$, mounted or fixed on a spindle $h'$, which is encircled by a sleeve $h^4$, on the outer projecting end of which sleeve is placed a knob or handle $h^2$. The pull conveyed by the knob $h^2$ to the sleeve $h^4$ is communicated to the spindle $h'$ by the material at the end of the slot $h^{12}$ in the sleeve $h^4$ coming in contact with the screw $h^{11}$, Figs. $2^b$ and 6. The springs $f^5$, through the cross-frame $h$, keep the screw $h^{11}$ against the lower end of the slot. The sleeve is held by the knob $h^2$. The object of the slot $h^{12}$ is to cause the movement of the release-key to act in its outward movement only. At the extremities of the arms of this cross-frame are placed forks $h^3$ for disengaging the sliding or feathered halves $f^4$ of the clutches before mentioned. Also, attached to the arms of this cross-frame are the four retaining-pawls $f^3$, one for each of the retaining ratchet-wheels, which are respectively in one with or fixed to its respective bevel-wheel $f$ and half-clutch $f^2$, as before described. In forming these ratchet-wheels we prefer to more deeply recess one cavity $f^8$ in the ratchet-wheels—namely, that one which takes the pawl when the ratchet-wheels are in their zero or normal position. By this means the pawls can only be put into gear with their ratchet-wheels when these wheels are in their normal or zero position, as the pawls, when the wheels are in any other position are unable to fall into gear with the other less recessed cavities of the ratchet-wheels. When the cross-frame $h$ is in its normal position, the pawls $f^3$, being then in gear with the ratchet-wheels, prevent the handle-spindles $a^3, b^3, c^3$, and $d^3$ rotating backward (which they otherwise would do) through the action of the helical or other suitable springs $i$ on the handle-spindles. The springs $i$, Figs. $2^b$ and 6, are for the purpose of returning the handles to their zero positions. Also, when the cross-frame is in its normal position the clutches are in gear.

Further, the mechanism above described is so adjusted and arranged that the two half-clutches $f^2$ and $f^4$ and the retaining pawls and wheels can only be brought into gear when both the actuating-handles and the disks have all returned to their zero position. Thus any indication on the inclined handle-plate $e$ is similarly shown at the indicating opening or openings $j$, and in this condition the machine remains until a further operation is required.

Before using the actuating-handles $a^4$, $b^4$, $c^4$, and $d^4$ the operator pulls the knob $h^2$, before mentioned. This disengages the pawls $f^3$ and the half-clutches $f^4$ from the ratchet-wheels $f'$ and from the corresponding half-clutches $f^2$, respectively, the pawls being released somewhat before the half-clutches. This movement also at the same time and at or near the end of its stroke sounds an alarm or bell $u$. When by this method both the pawls and clutches are released by the operator, the indicating-disks, operating-handles, and mechanism connecting the same are free at once to return to zero, such return being caused by the springs $i$, (or other suitable device,) attached to or on the spindles of the actuating-handles, and the springs $i$ on the disk-spindles or other suitable spindles.

Figures 12, 13, 14, 15, 16, 17:
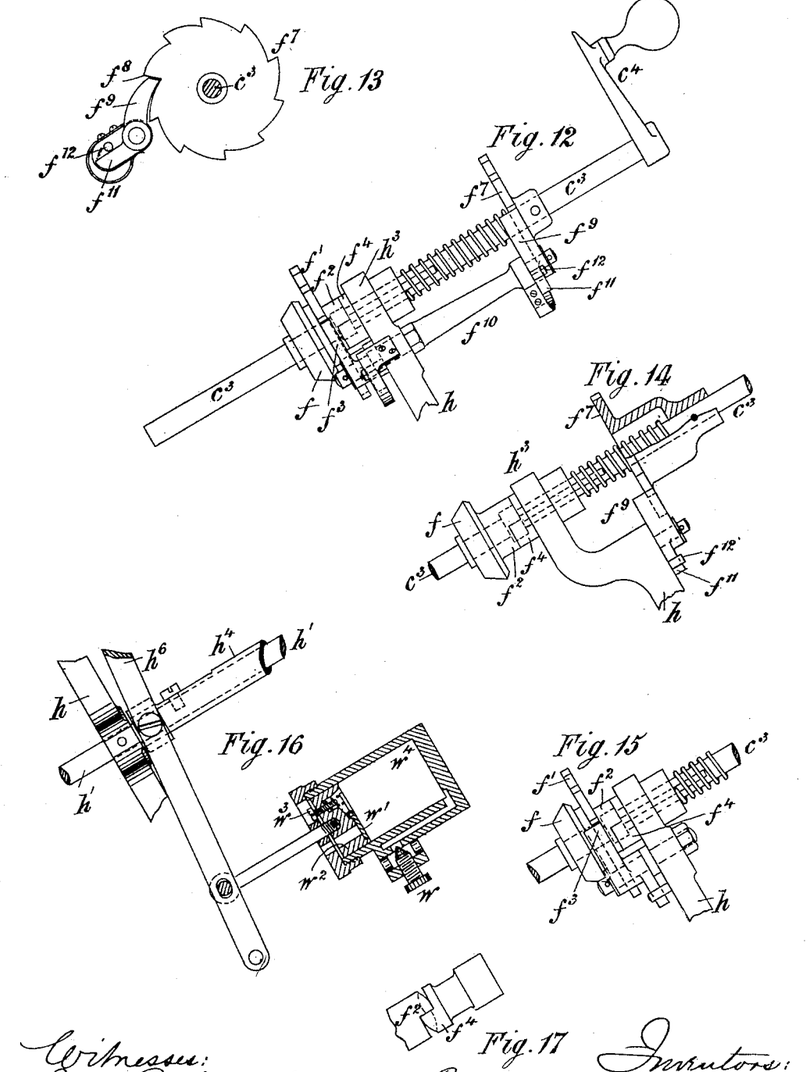
Figs. 12 to 17 are detail views of various parts of the mechanism.

We sometimes modify the before-mentioned arrangement so that the disks and their gearing return to their zero or normal position in advance of the actuating-handles, (and their spindles and half-clutches belonging to the same,) as shown in Figs. 12 and 13. When this modification is used, the wheels $b^5$ for actuating the type-disks are all keyed or fixed on their respective handle-spindles, as shown in Fig. 6. Also, we fix on the actuating-handle spindle $c^3$ a ratchet-wheel $f^7$, Figs. 6, 12, and 13, similarly divided as the before-mentioned ratchet-wheel $f'$—namely, having the cavity $f^8$, which takes the pawl $f^9$, (when the ratchet-wheels are in their zero or normal position,) more deeply recessed than the other cavities, for the purposes hereinbefore explained. The pawl $f^9$, which is attached to the standard $f^{10}$ and the latter to the arm of the cross-frame $h$, is provided, like the before-mentioned pawls, with a tail-piece $f^{11}$ and a spring to restrict its action by the stop $f^{12}$. These pawls—namely, the pawl $f^9$ and the pawl $f^3$—are so related to one another and to the half-clutches $f^2$ and $f^4$, that on the release-key being drawn out the pawl $f^3$ is first disengaged from its ratchet-wheel $f'$. Then the two half-clutches $f^2$ and $f^4$ are disengaged. Then at this point of the motion the disk and its gearing and the ratchet-wheel $f'$ and half-clutch $f^2$ are free and return to their zero position. The actuating-handle spindle $b^2$ and its half-clutch $f^4$ are still held by the ratchet-wheel $f^7$ and pawl $f^9$. On the further travel of the cross-frame $h$, the pawl $f^9$ is disengaged from the wheel $f^7$ and allows the actuating-handle spindle $b^2$ and half-clutch $f^4$ to return to their zero or normal position.

In Fig. 14 we show another arrangement in which we dispense with the ratchet-wheel $f'$ and pawl $f^3$. In this case we cause the two halves $f^2$ and $f^4$ of the clutch to be released before the pawl $f^9$ of the ratchet-wheel $f^7$ is disengaged. This (by the earlier release of the clutch) prevents renewed engagement except at the zero position.

Fig. 15 is a further modification in which the pawl $f^3$ is made wide enough to prevent the half-clutches $f^2$ and $f^4$ engaging with each other until the ratchet-wheel has arrived at its zero position.

Sometimes we regulate the speed of the release-key by a cataract or other suitable speed regulating or checking apparatus. In the present case, as shown in Fig. 16, it is constructed for air. By the screw $w$ on the cylinder $w^4$ we regulate the emission of air from the cylinder to give the required speed to the forward stroke of the release-key and its connections, and by the return stroke we give further scope for varying the speed by the valve $w'$ in the piston $w^2$ acting in conjunction with the admission of air by the screw $w$. The amount of opening of the valve $w'$ is regulated by means of the screw $w^3$.

Figure 11:
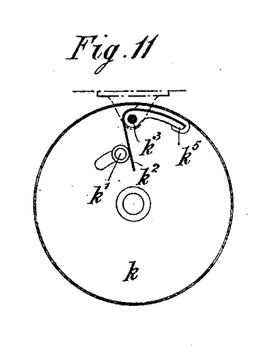
Fig. 11 is a view, partly in section, of our brake apparatus for checking the momentum of certain parts of the mechanism.

Suitable brake or retaining apparatus is applied where necessary to the spindles and disks to check recoil, as shown in Fig. 11. This we preferably construct as follows: On the spindle or part to be checked we mount a disk or wheel $k$, and we insert in the side of this disk $k$ a pin $k'$, which, on the disk approaching its position of rest, comes in contact with one arm $k^2$ of a bell-crank lever $k^3$, which is pivoted to a carriage or attached to some part of the framing of the machine. This arm $k^2$ has more or less spring in it, and the pin $k'$, as the wheel rotates, coming against the same, presses the brake-surface of the other arm $k^5$ of the bell-crank lever $k^3$ against a portion of the surface of the disk or wheel $k$.

The registration part of the mechanism may be effected by either or both of the before-mentioned systems — namely, by dials or printing, or by dials and printing.

When the dial and pointer system of registering is used, each transaction as it is indicated or shown is by suitable gearing at the same time recorded by means of hands or pointers $l$ upon one or more dials $l'$. On the face of each dial a suitable stop $l^2$ is formed for the purpose of facilitating the hands or pointers $l$ being set or adjusted to zero. This stop $l^2$ is so fashioned as to allow the hands to travel over it when moving in the direction for registering, but catches or stops the hands when turning back to zero. The hands or pointers $l$ of the dials $l'$ are actuated by means of pawls $l^3$ and ratchet-wheels $l^4$, working a train of wheel work or gearing $l^5$, suitably ratioed to the denomination of the respective dials, and on some wheel of the latter we place a suitable retaining-pawl when required. The motion for the hands or pointers of the dials is, by preference, taken from the before-mentioned vertical spindles $g$ by means of bevel or other suitable gearing $g^2$.

When we register by printing arrangements, we print the various transactions on a continuous ribbon through the intervention of another ribbon of carbonized paper or other suitably-prepared material placed between it and the type-disks. The carbonized ribbon after leaving the type-disk and passing between the feed-rolls is received and wound upon a reel $v$. This reel is rotated by a helical or other suitable spring $v'$, and fitted with suitable multiplying-gear $v^2$ to give the required number of revolutions to the reel $v$.

Figures 5, 8:
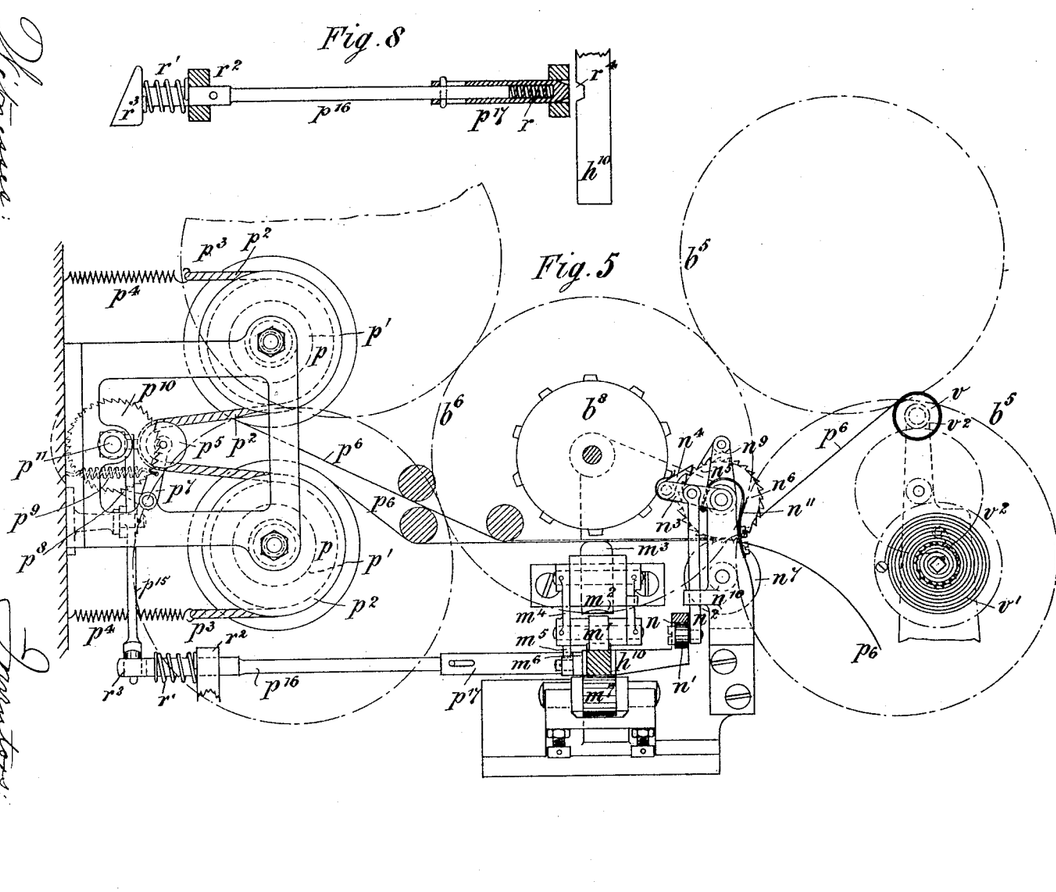
Fig. 5 is a front elevation showing the arrangement of the printing apparatus when a printed record is required to be kept, and also showing the method for automatically locking the machine when one or both of the ribbons is or are broken or exhausted.
Fig. 8 is a plan, partly in section, showing the shooting-bolt of the above locking apparatus.

The printing arrangement shown in Figs. 5 and 6 consists of disks, on the peripheries of which are placed type figures or numbers agreeing with the figures or numbers on the disks $a\ b\ c\ d$. These type-disks are actuated and set in any required position in the following manner, (and that we may be more clearly understood we will describe the action of one type-disk alone—as, for example, that one for printing the tens of cents—as the other disks are actuated in a similar manner.) On the end of the spindle $c^3$ upon which the actuating-handle $c^4$ is fixed is a toothed wheel $b^5$, which gears with another toothed wheel $b^6$, fixed upon the spindle or sleeve $b^7$, carrying a type-disk $b^8$, having the necessary figures and spaces arranged round its periphery. By this arrangement when the pointer of the actuating-handle $c^4$ is set to a figure on its annular path a similar figure on the corresponding indicating-disk $c$ will be shown at its opening, as before described, and also a similar figure on the type-disk $b^8$ will be in position for printing, both sets of figures working in unison with the figure or figures indicated by the pointer of the actuating-handle $c^4$. Upon the sleeve $h^4$, which encircles the spindle $h'$ of the release-key and to which sleeve the knob $h^2$ of the same is attached, is a pin or pins $h^5$, engaging with a lever $h^6$. One end $h^7$ of this lever is pivoted to the framing of the machine, the other end $h^8$ being jointed by means of a connecting-rod $h^9$ to a sliding bar $h^{10}$. This bar has upon it a suitably-shaped raised portion $m$, which comes in contact with the roller $m'$, attached to a platen-plunger $m^2$, thereby raising the roller and platen $m^3$ and giving the impression on the ribbon during the earlier part of the stroke of the sliding bar $h^{10}$. The above-mentioned roller $m'$ of the platen-plunger is pivoted and arranged in such a manner—namely, by being carried by links $m^4$, one of which has a projection $m^5$, which engages with a lever-catch $m^6$, pivoted to the before-mentioned sliding bar $h^{10}$—that it can tilt the roller $m'$ out of the way of its raised portion $m$, and thereby prevent the raising of the platen $m^3$ on the return stroke of the bar $h^{10}$. There is also an adjustable pressure-roller $m^7$ beneath the sliding bar $h^{10}$ to relieve the strain on the bar when printing.

When we record by printing, as described, we prefer to arrange the movement of the release-key $h^2$, Fig. 6, so that the first part of the motion of the key is used to actuate the platen $m^3$ through the intervention of the sliding bar $h^{10}$, and thereby give the impression before the release-key imparts motion to the other before-mentioned movements. During the latter part of the stroke of the release-key the disks are released, which release takes place in the following manner: The pin or screw $h^{11}$ in the spindle $h'$ on the further movement of the sleeve $h^4$, attached to the knob $h^2$, is caught by the material at the end of the slot $h^{12}$ in the sleeve and thereby carried forward. The spindle $h'$ and cross-frame $h$ are by this movement drawn forward, and consequently the clutches and pawls connected therewith are thereby lifted out of gear with or disengaged from the ratchet-wheels $f'$. This permits the ratchet-wheels $f''$, the disks $a\ b\ c\ d$, and the spindles $g$ and $a'\ b'\ c'\ d'$ and the gearing $g'$, connecting the same, to be returned to their normal position by the action of the before-mentioned springs $i'$; also, by the same movement the actuating-handles $a^3\ b^3\ c^3\ d^3$ and their spindles $a^2\ b^2\ c^2\ d^2$ and the half-clutches $f^4$ are returned to their zero position by the springs $i$. On the actuating-handle spindles $a^3\ b^3\ c^3\ d^3$, Fig. $2^b$, and the spindles connected with the disks, or on some other part connected therewith, we place arms $f^6$ and stops $f^{13}$ to stop those parts at their desired position. At the end or near the last part of the stroke of the release key or pull $a$ bell or alarm $u$ is sounded. This latter is actuated by the pin $u'$ on the release-key striking the tail end $u^2$, as shown in Fig. $2^b$. This alarm gives notice that the amount of the last transaction then being cleared from the indicating opening or openings by the release-key has been registered, and that the machine is in a condition to indicate and register a new transaction.

Figure 3:
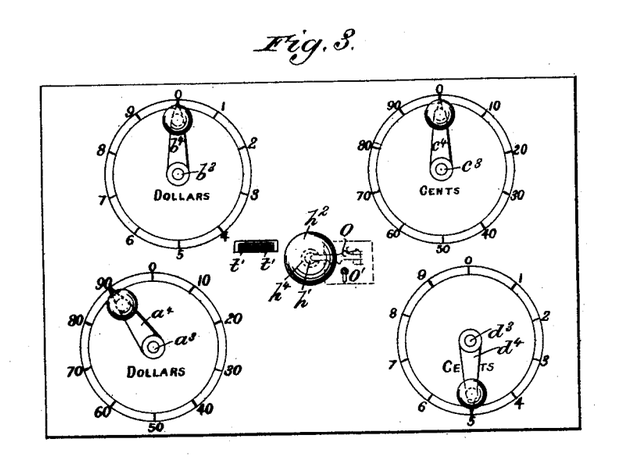
Fig. 3 is a face view of the general arrangement of actuating-handles and fixed dials for the same.
Figure 7:
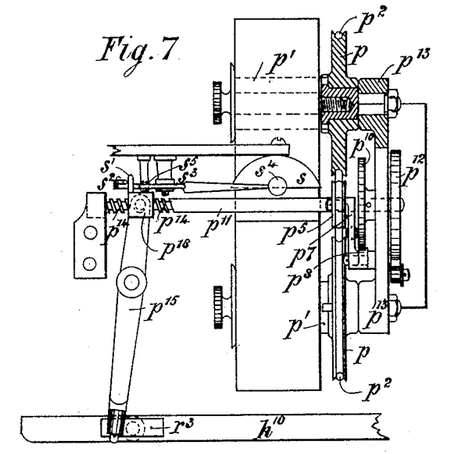
Fig. 7 is a side elevation, partly in section, of the above-mentioned locking apparatus.
Figure 9:
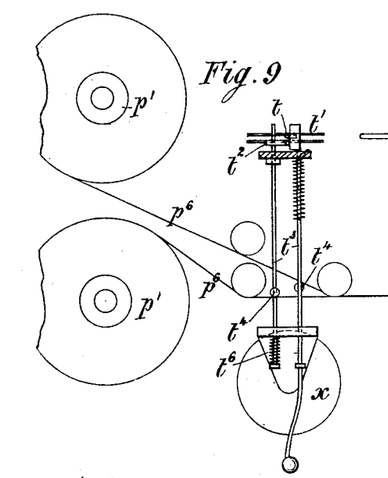
Fig. 9 is a front elevation, partly in section, showing the alarm or signaling apparatus for indicating when the ribbons are broken or exhausted.
Figure 10:
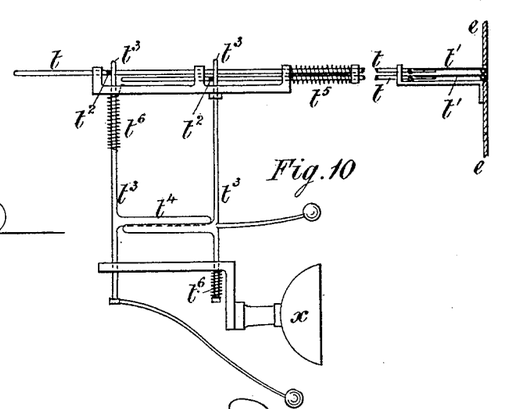
Fig. 10 is a side elevation of the above-mentioned apparatus.

The machine is sometimes provided with a suitable locking arrangement for the purpose of fixing the releasing-key or other suitable part, so as to prevent the machine being unauthoritatively worked, as shown in Fig. 3. This we carry out by shooting the bolt $o$ of an ordinary lock $o'$ into the spindle of the releasing-key $h^4$. We utilize the latter part of the movement of the sliding bar $h^{10}$ to move the paper, as shown in Fig. 5. The latter operation is performed by the raised portion $n$, attached to the sliding bar $h^{10}$, coming in contact with the roller $n'$ at the end of the connecting-rod $n^2$, pulling down the same, and thereby giving motion to the lever $n^3$ and the pawl $n^4$. This pawl actuates the ratchet-wheel $n^5$, the latter being fixed to the spindle of one of the feed-rollers $n^6$ and imparts the proper motion to the same. The other feed-roller $n^7$ is actuated by the toothed wheels $n^8$, connecting the same, and thus the paper is moved forward for a new transaction. The ratchet-wheel $n^5$ is provided with a retaining-pawl $n^9$. The connecting-rod $n^2$ is guided at its lower end by the fixed bearing $n^{10}$. The roller $n'$ is kept in contact with the race $n$ by the spring-arm $n^{11}$, Fig. 5, in which said roller is journaled. We also, in cases where we register by printing, arrange the mechanism as shown in Figs. 5, 7, and 8, so that when either of the lengths of ribbon has run out or become broken the machine becomes locked and cannot be further worked; and this mechanism may also be made to sound a bell or alarm and actuate a warning-indicator, as shown in Figs. 7, 9, and 10. This locking apparatus consists of a frictional attachment to the two reels, on which the ribbons are wound, whereby on either of them being run out of ribbon or on breaking of either of the ribbons, a spring is released and thereby allowed to act so as to shoot a bolt into some part of the mechanism of the machine having motion, thus locking the machine and preventing its being further used while in that state. We arrange the mechanism of the above locking apparatus in the following manner: We attach a grooved pulley $p$ to each of the supply-ribbon reels $p'$, so that the two rotate together—namely, each reel and its accompanying grooved pulley. A band or cord $p^2$ is passed partly round the two grooved pulleys $p$, having its ends $p^3$ fixed or attached by the intervention of a spring $p^4$ to some part of the framing of the machine, while that portion of the cord lying between the grooved pulleys $p\ p$ is kept taut by a third or intermediate pulley $p^5$, which presses down the cord, so giving between it and those portions of the grooved pulleys with which it is in contact a certain amount of friction, but not more friction than the strength of the ribbons $p^6$ will bear in their action of rotating the pulleys when being unwound from the same by the motion of the feed-rollers $n^6$ and $n^7$ of the printing mechanism before described. The intermediate pulley $p^5$ is pivoted to one end of a bell-crank lever $p^7$, the other end of which forms a pawl $p^8$, which is, by means of the pull or drag of the ribbons $p^6$, kept in gear with a ratchet-wheel $p^{10}$. This ratchet-wheel is fixed on a spindle $p^{11}$, to which is also attached one end of a suitable spring $p^{12}$, the other end of the spring being fastened to the frame $p^{13}$ of the machine. When the pawl $p^8$ is out of gear with the ratchet-wheel $p^{10}$, which takes place when either of the ribbons is run out or accidentally broken, (for then the spring $p^9$, connected to the bell-crank lever $p^7$, can pull the pawl $p^8$ out of gear,) the spring $p^{12}$, attached to the spindle, rotates the same, and in so doing, by means of a screw $p^{14}$ on the other end of the spindle $p^{11}$, working into a nut $p^{18}$ on the lever $p^{15}$, propels, by means of the other end of the lever, a bolt $p^{16}$ (provided with a telescopic spring end $p^{17}$) forward into some suitable moving portion of the mechanism, preferably when at its position of rest.

In the drawings the aforesaid locking apparatus is shown arranged so as to shoot a bolt into a groove formed in the sliding bar $h^{10}$, preferably on that arriving at the end of its return stroke, as shown in Fig. 8. The action and construction of the above-mentioned bolt is as follows: The lever $p^{15}$, acting against the incline $r^3$ of the bolt, presses the same forward in opposition to the spring $r'$, which is placed between $r^3$ and the fixed bearing $r^2$. Between the telescopic end $p^{17}$ and the bolt $p^{16}$ there is a spring $r$. When this spring is under compression, by the advance of the bolt $p^{16}$ it has sufficient power to drive the telescopic end $p^{17}$ forward until it shoots the same into the notch $r^4$, or shoots it onto the bar, where it remains with the spring $r$ compressed until by the motion of the bar the notch $r^4$ in the bar comes into position to receive the telescopic end. When the pressure exerted by the lever $p^{15}$ is removed, the spring $r'$ restores the bolt to its normal position.

The alarm-bell $s$, Fig. 7, connected with the before-mentioned mechanism for giving notice when the paper has become nearly exhausted or broken, is actuated by the projection $s'$ on the nut $p^{18}$, Fig. 7, coming in contact with the tail end $s^2$ of the bell-hammer lever $s^3$. This causes the bell to be struck by the hammer $s^4$ when the nut is moving in one direction—namely, when moving in the direction for locking. The hammer is returned to its normal position by the spring $s^5$. To escape actuating the bell when the nut is being returned for resetting the bell, the tail end $s^2$ of the lever $s^3$ is provided with a rule-joint and spring to the same.

In lieu of the before-mentioned locking-gear, we also arrange an arm or tablet to each length of ribbon to be conspicuously displayed to give notice when either of the ribbons has nearly run out or broken. This arrangement is shown in Figs. 9 and 10, and is as follows: We fit upon one end of a rod $t$ an indicator $t'$, Figs. 9, 10, and 18, located in any convenient portion of the machine-casing, and jointed to the rod $t$, so that on its being fully projected by the spring $t^5$ it flaps down and is conspicuously exposed to view. On the other end of the same rod $t$ we place a projection or catch $t^2$, which is caught and held back by one end of the rod $t^3$, near the other end of which is an arm $t^4$, which rests against some portion of the ribbon in tension—namely, some part of the ribbon between the reels and the feed-rollers. Each of these rods is fitted with a spiral or other form of spring $t^6$, which has a tendency to disengage or withdraw its upper end from the catch $t^2$, but is prevented from so doing by reason of the projection or arm $t^4$ on the rod $t^3$ being caught or held back by the ribbon. When the ribbon is exhausted from the reels or is broken, the projection or arm being then freed, the rod shoots forward and the warning-indicator is thrust forward and displayed, and by the same movement a bell or alarm $x$ is sounded. A modification of the above dual arrangement of signaling may be made by attaching only the display-signal portion or only the bell or alarm.

In applications of even date herewith, Serial Nos. 326,816 and 326,817, we have shown, described, and claimed in the first above-named case the combination, in a cash-register, of a series of concentrically-mounted cylinders adapted to indicate any desired amount, means for operating said cylinders to expose the amount registered, a printing mechanism for recording the said amounts, and a case or cover adapted to conceal either the figure-openings or the operating-levers, and in the last above-named case the combination, in a cash-register, of a series of oscillating tablets, means for concealing certain tablets, levers for operating said tablets, a series of key-levers, a series of pawls each adapted to hold a tablet in its exposed position and to release it when a key is actuated, mechanism connected with and operated by the key-levers to tilt said pawls and release the tablets, and printing mechanism operated by the key-levers, and we would have it understood that we do not claim such in this application.

What we herein claim as our invention is—

1. In a cash-register, the combination, with indicating, registering, and recording or printing mechanisms, of handles adapted to set the same, and springs for returning the recording or printing devices to normal position, substantially as described.

2. In a cash-register, the combination, with the indicating, registering, and recording or printing mechanisms, handles for setting the same, and springs for returning the recording or printing devices to normal position, of retaining devices for holding the recording or printing devices in their set positions, and an auxiliary knob or handle adapted to release said devices to the action of the returning-springs, substantially as described.

3. In a cash-register, the combination, with the indicating, registering, and printing mechanisms, the actuating-handles, and the returning-springs, of the mechanism consisting of clutches $f^2 f^4$, ratchet-wheels and segment $f'$, pawls $f^3$, cross-frame $h$, and the knob $h^2$, whereby the indicating and registering devices are adapted to be simultaneously released and caused to return to zero, substantially as described.

4. The combination, with the type-wheels, the platen $m^3$, platen-plunger $m^2$, and link $m^4$, carrying said plunger, of the movable frame $h^{10}$ and cam $m$ on said frame, whereby the platen-plunger is raised as the frame is moved, substantially as described.

5. The combination, with the type-wheels, the platen, platen-plunger, the links pivoted to said plunger, the movable frame, and the cam for acting upon and raising said links and plunger, of the projection $m^5$ on one of said levers and the catch $m^6$ on the frame, whereby the platen is raised in the forward movement of the frame but not in its return movement, substantially as described.

6. In a cash-register printing mechanism, the combination, with the type-wheels, webs of carbonized ribbon and paper, and the movable frame, of the feed-rollers $n^6$, ratchet-wheel $n^5$, pawl $n^4$, lever $n^3$, connecting-rod $n^2$, roller $n'$, and cam $n$, whereby the ribbons are fed by the movement of the frame $h^{10}$, substantially as described.

7. In a cash-register printing mechanism, the combination, with the type-wheels, ribbons, platen, and movable frame for operating the same, of mechanism connected with the supply-ribbon reels, whereby the running out or breaking of said ribbons will automatically lock the movable frame, substantially as described.

8. In a cash-register-printing mechanism, the combination, with the type-wheels, ribbons, platen, and movable frame for operating the same, of the supply-ribbon reels $p'$, grooved pulleys $p$, attached to said reels, the intermediate spring-governed pulley $p^5$, and a spring-governed cord $p^2$, whereby the tension on the reels is maintained uniform as the ribbons are unwound, substantially as described.

9. The combination, with the ribbon-reels $p'$, grooved pulleys $p$, intermediate pulley $p^5$, and spring-governed cord engaging said pulleys, of the bell-crank lever $p^7$, pawl $p^8$, and ratchet-wheel $p^{10}$ in gear with said pawl, all arranged and operating to disengage said pawl when either of the ribbons run out or is broken, substantially as described.

10. The combination, with the ribbon-reels, grooved pulleys, intermediate pulley, a cord engaging said pulleys, and a spring-operated shaft $p^{11}$, of the lever, pawl-and-ratchet connection between the intermediate pulley and the shaft, substantially as described, normally retaining said shaft immovable, but adapted to release and permit its rotation upon the running out or breaking of either of the ribbons, substantially as described.

11. The combination, with the spring-actuated shaft $p^{11}$ and mechanism for normally retaining it immovably, of a pivoted lever $p^{15}$, engaged with the screw-threaded end of said shaft, and a locking-bolt $p^{16}$, adapted to be projected by said pivoted lever when the shaft is rotated, substantially as described.

12. The combination, with the movable frame $h^{10}$, having the slot $r^4$ therein, the bolt $p^{16}$, and mechanism for projecting said bolt against the frame, of the telescopic end $p^{17}$, and the spring $r$, adapted to press the movable frame and engage the slot therein as it registers therewith, substantially as described.

13. In a cash-register printing mechanism, the combination, with the ribbons $p^6$, the spring-impelled rods $t^3$, and arms $t^4$, engaging with said ribbons, of the indicators $t'$, and spring-impelled rods $t$, connected therewith and with the rods $t^3$, whereby the breaking or running out of either of the ribbons acts to project the indicators through the register-casing, substantially as described.

FREDERICK ALFRED MESSER.
WALTER FULLER THORPE.

Witnesses:
GEORGE C. DOWNING,
    8 *Quality Court, London, W. C.*
T. F. BARNES,
    17 *Gracechurch Street, London.*